(12) United States Patent
Yoshioka et al.

(10) Patent No.: US 7,745,038 B2
(45) Date of Patent: Jun. 29, 2010

(54) ALKALINE DRY BATTERY AND SEALING GASKET THEREFOR

(75) Inventors: Itsue Yoshioka, Shizuoka (JP); Kiyohide Tsutsui, Shizuoka (JP); Yuji Tsuchida, Shizuoka (JP); Yukiyoshi Murakami, Shizuoka (JP); Tatsuya Yamazaki, Shizuoka (JP); Yuji Takahashi, Shizuoka (JP); Masato Nakamura, Shizuoka (JP); Takeo Nogami, Shizuoka (JP)

(73) Assignee: FDK Energy Co., Ltd. (JP)

( * ) Notice: Subject to any disclaimer, the term of this patent is extended or adjusted under 35 U.S.C. 154(b) by 1155 days.

(21) Appl. No.: 11/365,551

(22) Filed: Mar. 1, 2006

(65) Prior Publication Data

US 2006/0222938 A1    Oct. 5, 2006

Related U.S. Application Data

(63) Continuation-in-part of application No. PCT/JP2004/013009, filed on Sep. 1, 2004.

(51) Int. Cl.
*H01M 2/12* (2006.01)
*H01M 2/00* (2006.01)

(52) U.S. Cl. .................. 429/53; 429/56; 429/57; 429/163

(58) Field of Classification Search ............ 429/53, 429/56, 163, 57
See application file for complete search history.

(56) References Cited

U.S. PATENT DOCUMENTS

| 5,080,985 A | 1/1992 | Wiacek et al. |
| 5,712,043 A * | 1/1998 | Chen et al. ............. 428/500 |
| 5,932,371 A * | 8/1999 | Tucholski ............. 429/185 |
| 2002/0090549 A1 | 7/2002 | Urade et al. |

FOREIGN PATENT DOCUMENTS

| EP | 0107267 A1 | 5/1984 |
| JP | 60-077352 | 5/1985 |
| JP | 60-77352 | 5/1985 |
| JP | 09-027305 | 1/1997 |
| JP | 9-27305 | 1/1997 |
| JP | 11-86810 | 3/1999 |
| JP | 11-086810 | 3/1999 |

* cited by examiner

*Primary Examiner*—Patrick Ryan
*Assistant Examiner*—Julian Mercado
(74) *Attorney, Agent, or Firm*—Clements Bernard PLLC; Christopher L. Bernard; Lawrence A. Baratta, Jr.

(57) ABSTRACT

In an alkaline dry battery using a polyamide resin sealing gasket that is placed between a battery case and an anode terminal plate without using a stiffening member and seals the battery case in an airtight manner, the sealing gasket includes a first and a second thin wall parts and is formed of polyamide resin, polyhexamethylene dodecanamide.

4 Claims, 3 Drawing Sheets

(b)

(a)

LR03

LR6

LR6

ALKALINE DRY BATTERY AND SEALING GASKET THEREFOR

CROSS-REFERENCE TO RELATED APPLICATIONS

This application is a continuation-in-part of the International Application No. PCT/JP2004/013009 filed on Sep. 1, 2004 designating the United States of America.

BACKGROUND OF THE INVENTION

1. Field of the Invention

The present invention relates to an alkaline dry battery and a sealing gasket therefor, and is effective, for example, for applying to a cylindrical alkaline dry battery of LR6 type (AA), LR03 type (AAA), or the like.

2. Description of the Related Art

A cylindrical alkaline dry battery of a type such as LR6, LR03, for example as disclosed in Japanese Patent Application Laid-Open Publication No. H11-250875 (hereinafter referred to as "Reference 1"), has an alkaline power generation element consisting of a cathode mixture, a separator, and a anode mixture contained in a cylindrical metallic battery case with a closed bottom, and an opening of the battery case is sealed in an airtight manner using a resin gasket.

The power generation element in which a tubular separator impregnated with an alkaline electrolyte is placed inside of a tubular molded cathode mixture, and a gelled anode mixture is filled inside of this separator. The battery case serves as both a cathode current collector and a cathode terminal by directly contacting the cathode mixture. Inside of the anode mixture, a metallic anode current collector in a bar shape is inserted. This anode current collector is fixed by welding upright on an internal surface of the dish-shaped metallic anode terminal plate. The anode terminal plate, the anode current collector, and the sealing gasket are preassembled together, and they become a sealing unit that closes an opening of the battery case.

The sealing gasket is an integrated molding product of polyamide resin and its perimeter part is disposed between the battery case and the anode terminal plate, and forms an airtight seal therebetween by stress deformation (elastic deformation) caused by flexing the opening of the battery inwardly.

In the alkaline dry battery of Reference 1, a metallic stiffening member is placed between the anode terminal plate and the gasket to achieve a desired configuration for ensuring the airtight sealing condition. This stiffening member is also called as a supporting member or a neutral ring. The perimeter part of the gasket is strongly pressed (crimped) between the stiffening member and the battery case opening and subject to stress deformation. At this time, the stiffening member works as a supporting member for strongly crimping the perimeter part of the gasket and for shape retaining that prevents development of stress distortion or deformation to the entire gasket by its partial crimping.

In this manner, a configuration of providing the stiffening member to the sealing gasket is effective for ensuring the sealing effect by the stress deformation of the perimeter part of the gasket, and is generally adopted by the alkaline dry batteries other than disclosed in Reference 1.

In this case, a shape/structure of the sealing gasket is determined with taking the use of the stiffening member into account. In terms of material of the sealing gasket, many kinds of polyamide series resin are disclosed and listed without specific notes, for example, in Japanese Patent Application Laid-Open Publication No. H09-27305 (hereinafter referred to as "Reference 2"). However, when the use of stiffening member is premised, the difference between the kinds of resin disclosed therein does not cause any particular difference that significantly relates to performance of the alkaline dry battery even though there would some specific difference of resin such as moldability or general physical property. This is presumed that the use of the stiffening member compensates the difference between the kinds of resin.

As described above, many of conventional alkaline dry batteries are configured to employ the stiffening member to the resin sealing gasket made of polyamide or the like for achieving the sealing structure that prevents leakage of alkaline electrolyte.

However, the use of the stiffening member causes a problem which increases a cost because of increase in number of parts and assembly steps. Further, the increase in number of parts creates a problem in which a number of portions increase that could cause failure.

For these reasons, the present inventors have been seeking for many years the alkaline dry battery having a unique sealing structure that can dispense with use of the stiffening member. This unique sealing structure has been applied to actual products and achieved satisfactory results.

In the cylindrical alkaline dry battery of a type such as LR6 or LR03, the unique sealing structure different from the structure essentially requiring stiffening, use of the stiffening member is necessary for obtaining a required sealing effect to prevent leakage of the alkaline electrolyte with only the sealing gasket and not using the stiffening member. This sealing structure with the unique configuration (with no stiffening structure) utilizes a sealing gasket 30' of a shape/structure as shown in FIG. 3.

FIG. 3 shows a cross section of an alkaline dry battery 10' that has been resulted from a research by the inventors and practically applied prior to the present invention. The sealing gasket 30' used in the alkaline dry battery 10' is an integrated molding product of a polyamide resin (Nylon66), and has a central boss 31, a perimeter part 32, a middle barrier 33, a safety valve, and a stress absorbing part by thin wall parts 35 and 36. The central boss 31 is a part through which an anode current collector 25 is inserted, the collector 25 being arranged upright by welding on a dish-shaped metallic anode terminal plate 40.

The perimeter part 32 is a circular part sandwiched and supported between an opening 16 of a battery case 15 and a peripheral part 42 of the anode terminal plate 40, and forms an airtight sealing condition by stress deformation (elastic deformation) caused by flexing the opening 16 of the battery case 15 inwardly.

A safety valve is a part that relieves an internal pressure by breaking beforehand when an internal pressure of the battery case 15 abnormally increases, and is formed with the first thin wall part 35 provided in the circular part between the boss 31 and the barrier 33. In the anode terminal plate 40 is provided a small opening 41 for releasing a gas.

A stress absorbing part is defined with the second thin wall part 36 formed by bending the circular part between the perimeter part 32 and the barrier 33, and absorbs the stress deformation or distortion caused when the perimeter part 32 is pinched and pressed between the battery case opening 16 and the anode terminal plate peripheral part 42, that would affect to a part other than the perimeter part 32.

The sealing gasket 30' of the above structure can achieve a sealing effect equivalent to when using the stiffening member even when the stiffening member is not actually used.

For the sealing gasket 30 of this non-stiffening type, as a result of numerous studies by the inventors, they have reached to obtain the following facts for improving reliability of safety valve operation and anti-leakage performance.

In other words, according to the facts found by the inventors, in the gasket 30' of the non-stiffening type, even when the resin used in the structural material is the same polyamide resin, it is revealed that the reliability of the safety valve operation and the anti-leakage performance can distinctively differ according to a kind of resin selected among the species of resin in a polyamide resin as a genus. In other words, it is revealed that the reliability of the safety valve operation and the anti-leakage performance can be particularly improved by constructing the sealing gasket of the non-stiffening type, which does not use the stiffening member, with the specific kind of polyamide resin.

The polyamide resin demonstrating this distinctive effect is polyhexamethylene dodecanamide called Nylon 612 (trade mark), and is proved to bring the distinctive change (effect) to the reliability of the safety valve operation and the anti-leakage performance only when it is used in combination with the above-mentioned shape/structure with non-stiffening structure.

This polyhexamethylene dodecanamide is, conventionally, disclosed as one of a polyamide type resin group without noting specific preference to such use, for example, in References 1 and 2, or the like. However, the relationship of the reliability of the safety valve operation and the anti-leakage performance in the alkaline dry battery with the kind of the resin used is not disclosed. From References 1 and 2, it can be speculated that polyhexamethylene dodecanamide which is one kind of polyamide resin can be replaced with polyhexamethylene adipamide (Nylon 66) or the like, but there is no disclosure that suggests the difference over the effect that relates to the reliability of the safety valve operation and the anti-leakage performance in the alkaline dry battery.

In addition, the sealing gasket of non-stiffening type which is in combination with the sealing structure using the stiffening member does not bring the distinctive effect to the reliability of the safety valve operation and the anti-leakage performance. Polyhexamethylene dodecanamide (Nylon 612) brings the effect of distinctively improving the reliability of the safety valve operation and the anti-leakage performance only in combination with the shape/structure that does not use the stiffening member, and this effect is revealed by the inventors as described above.

SUMMARY OF THE INVENTION

This invention is created under the circumstance of the background art as above, and one object thereof is to certainly improve the reliability of the safety valve operation and the anti-leakage performance in an alkaline dry battery using a sealing structure with a small number of parts and a low cost.

One aspect of the present invention is an alkaline dry battery comprising an alkaline power generation element including a cathode mixture formed into a tubular shape, a separator disposed inside the cathode mixture, the separator being impregnated with an alkaline electrolyte, and a gelled anode mixture filled in the inside of the separator, a cylindrical metallic battery case with a closed bottom that contains the alkaline power generation element and serves as both a cathode terminal and a cathode current collector, a dish-shaped metallic anode terminal plate having a bar-shaped anode current collector fixed vertically thereon in an internal surface thereof, the anode current collector being inserted into the anode mixture of the power generation element, and a sealing gasket of a polyamide resin disposed between the battery case and the anode terminal plate without using a stiffening member to seal the battery case in an airtight manner, wherein the sealing gasket formed as an integrated molding product includes a central boss through which the anode current collector is inserted, a perimeter part which is disposed between an opening of the battery case and a peripheral part of the anode terminal plate and forms an airtight sealing by stress deformation caused by flexing the opening of the battery case inwardly, a middle barrier positioned between the boss and the perimeter part, a safety valve configured by a first thin wall part provided in a circular part between the boss and the middle barrier, and a stress absorbing part configured by a second thin wall part formed by bending the circular part between the perimeter part and the barrier, and wherein the sealing gasket is made of a polyamide resin of polyhexamethylene dodecanamide.

In the above gasket, preferably, a thickness of the thin wall part can be less than or equal to 0.25 mm. The stress absorbing part can be formed by the thin wall part having a U-shaped cross-sectional shape. A total area of the thin wall part can be greater than or equal to 5% of a circumferential cross sectional area of the battery.

Another aspect of the present invention is a sealing gasket used in the above alkaline dry battery, the sealing gasket formed of a polyamide resin with a safety valve function, the sealing gasket comprising a central boss through which the anode current collector is inserted, a perimeter part which is disposed between an opening of the battery case and a peripheral part of the anode terminal plate and forms an airtight sealing by stress deformation caused by flexing the opening of the battery case inwardly, a middle barrier positioned between the boss and the perimeter part, a safety valve configured by a first thin wall part provided in a circular part between the boss and the middle barrier, and a stress absorbing part configured by a second thin wall part formed by bending the circular part between the perimeter part and the barrier, wherein the sealing gasket is an integrated molding product, and wherein the sealing gasket is made of a polyamide resin of polyhexamethylene dodecanamide.

The characteristic other than described above and its object of the present invention will be apparent by reading the description of this specifications with referencing the attached figures.

Figure 1:
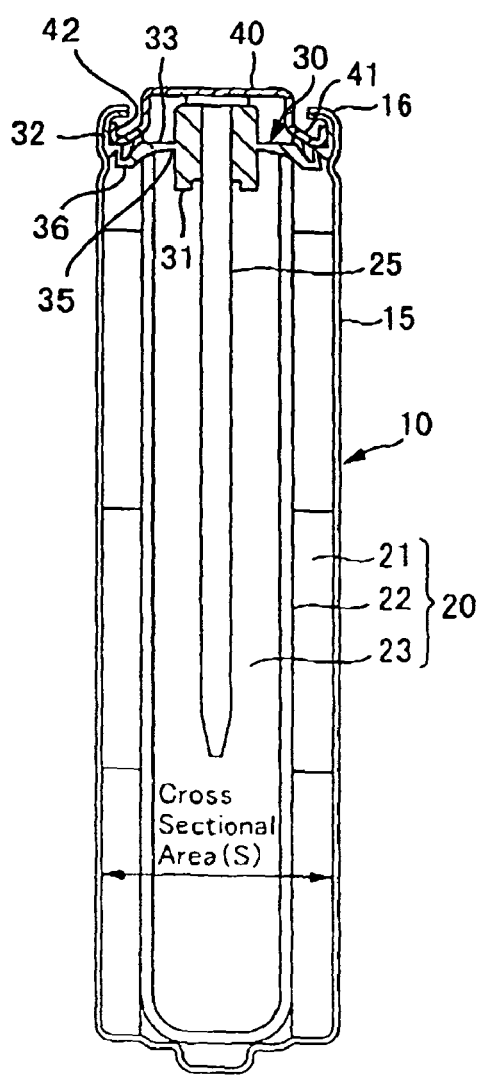
FIG. 1 is a cross-sectional view of an implementation of the alkaline dry battery and the sealing gasket therefor according to the present invention.
Figure 1:
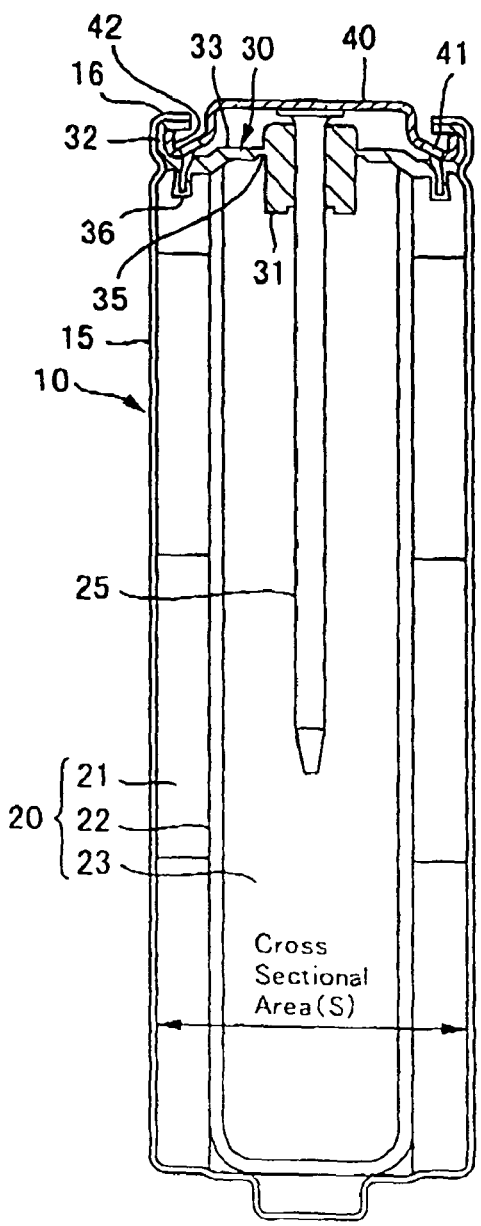

It is to be noted that the main reference numerals used in the figures are listed as follows.

10: Alkaline dry battery (present invention); 10': Alkaline dry battery (conventional product); 15: Battery case; 16; Opening part; 20: Power generation element; 21: Cathode mixture; 22: Separator; 23: Anode mixture; 25: Anode current collector; 30: Gasket (polyhexamethylene dodecanamide/Nylon 612 made); 30': Gasket (polyhexamethylene adipamide/Nylon 66 made); 31: Central boss; 32: Perimeter part; 33: Middle barrier; 35: First thin wall part; 36: Second thin wall part; 40: Anode terminal plate; 41: Small opening for degasification; 42: Peripheral part

DETAILED DESCRIPTION OF THE INVENTION

FIG. 1 shows the cross-sectional view of the alkaline dry battery adopting the technique of the present invention. FIG. 1(*a*) is a practical example of the LR6 type alkaline dry battery and FIG. 1(*b*) is a practical example of the LR03 type alkaline dry battery.

A main difference between the two alkaline dry batteries is a battery size, but other configurations are basically the same except some difference such as shape.

An alkaline dry battery 10 as shown in FIG. 1 in which an alkaline power generation element 20 including a cathode mixture 21, a separator 22, and an anode mixture 23, which is the same as conventional one, is contained in a cylindrical metallic battery case 15 with a closed bottom, and its opening 16 of the battery case 15 is sealed in an airtight manner by using a resin gasket 30.

The power generation element 20 in which the tubular separator 22 impregnated with an alkaline electrolyte is placed inside of the tubular cathode mixture 21, and the gelled anode mixture 23 is filled inside of the separator 22. The battery case 15 serves as both a cathode current collector and a cathode terminal by directly contacting the cathode mixture 21. Inside of the anode mixture 23, a metallic anode current collector 25 in a bar shape is inserted thereinto. This anode current collector 25 is fixed by welding upright at a center of an internal surface of a dish-shaped metallic anode terminal plate 40. In the anode terminal plate 40, the small opening 41 for releasing a gas is provided. The anode terminal plate 40, the anode current collector 25, and the sealing gasket 30 are preassembled together, and they configure a sealing unit that closes an opening of the battery case.

The sealing gasket 30 is placed between the battery case 15 and the anode terminal plate 40 without use of a stiffening member and seals the battery case 15 in an airtight manner. The structural material of the sealing gasket 30 is polyhexamethylene dodecanamide (nylon 612), and has a following shape/structure.

That is, the sealing gasket 30 has a central boss 31, a perimeter part 32, a middle barrier 33, a first thin wall part 35, and a second thin wall part 36 in an integrated manner. The central boss 31 has a through-hole through which the anode current collector 25 is inserted along the central axis thereof as the collector 25 is compressed by the surrounding boss 31. The perimeter part 32 is disposed between the opening 16 of the battery case 15 and the peripheral part 42 of the anode terminal plate 40, and defines an airtight sealing by stress deformation (elastic deformation) caused by flexing the opening 16 of the battery case 15 inwardly. The middle barrier 33 isolates the boss 31 from the perimeter part 32 in an airtight manner.

The first thin wall part 35 acts as a safety valve that relieves an internal pressure by breaking beforehand when the internal pressure of the battery case 15 abnormally increases. This thin wall part 35 is formed in a circular part between the boss 31 and the barrier 33. A working pressure of the safety valve can be determined by a thickness of the thin wall part 35. However, if the material of the sealing gasket 30 is polyhexamethylene dodecanamide (nylon 612), it is suitable for the thickness to be less than or equal to 0.25 mm to surely activate the safety valve.

The second thin wall part 36 is formed by bending the circular part between the perimeter part 32 and the barrier 33. By this means, the second thin wall part 36 acts as a stress absorbing part. In other words, the second thin wall part 36 absorbs a stress deformation or distortion, which is caused by when the perimeter part 32 is pinched and pressed between the battery case opening 16 and the anode terminal plate peripheral part 42, that would affect to a part other than the perimeter part 32. To surely obtain this absorbing effect, it is preferred that the thickness of the thin wall part 36 is to be less than or equal to 0.25 mm. Further, it is better for the thin wall part 36 to be bent so as to form a U-shaped cross-section.

In case of using polyhexamethylene dodecanamide (nylon 612) as a structural material of the sealing gasket 30, it is preferred that the total area of the first and the second thin wall parts 35, 36 is greater than or equal to 5% of the circumference cross-sectional area (S) of the battery 10.

Figure 2:
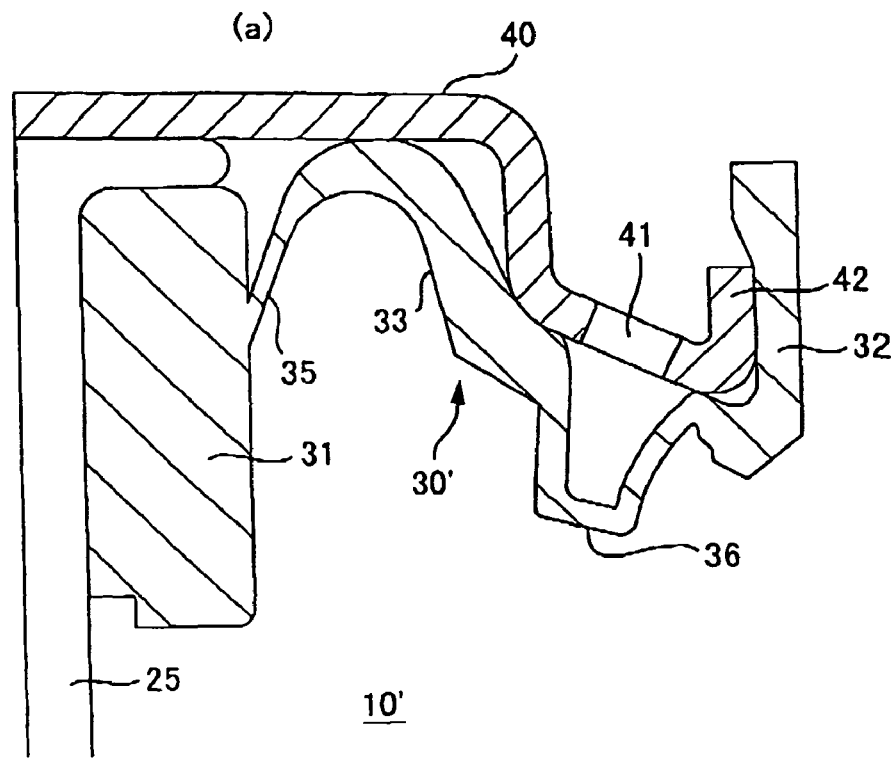
FIG. 2 is partial cross-sectional views showing each gasket in a deformation condition of the conventional alkaline dry battery and the alkaline dry battery of the present invention.
Figure 2:
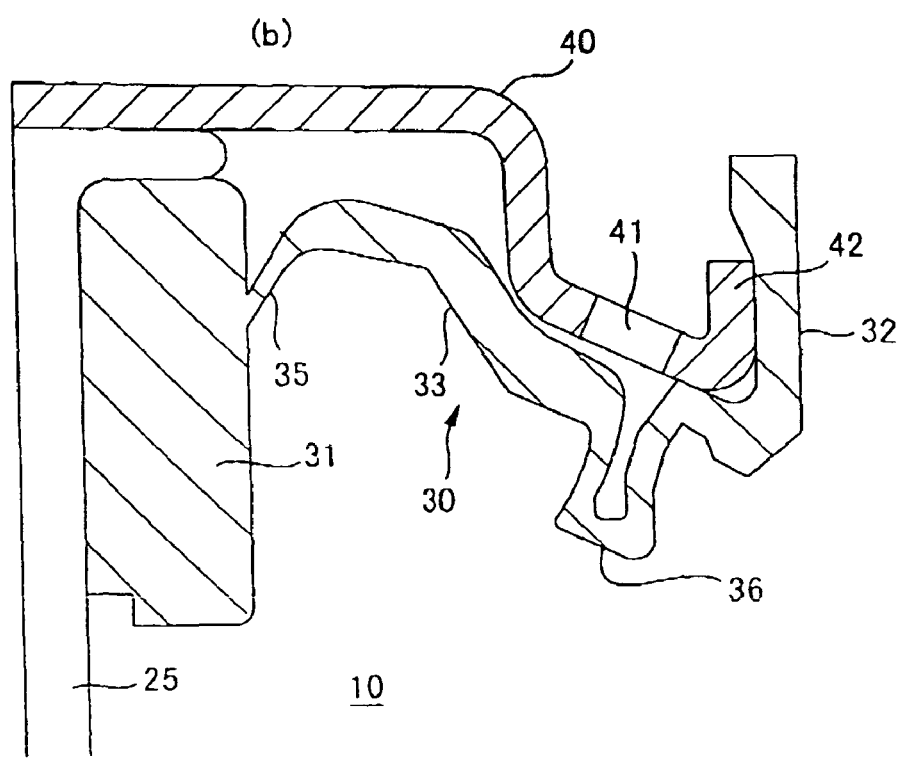
Figure 3:
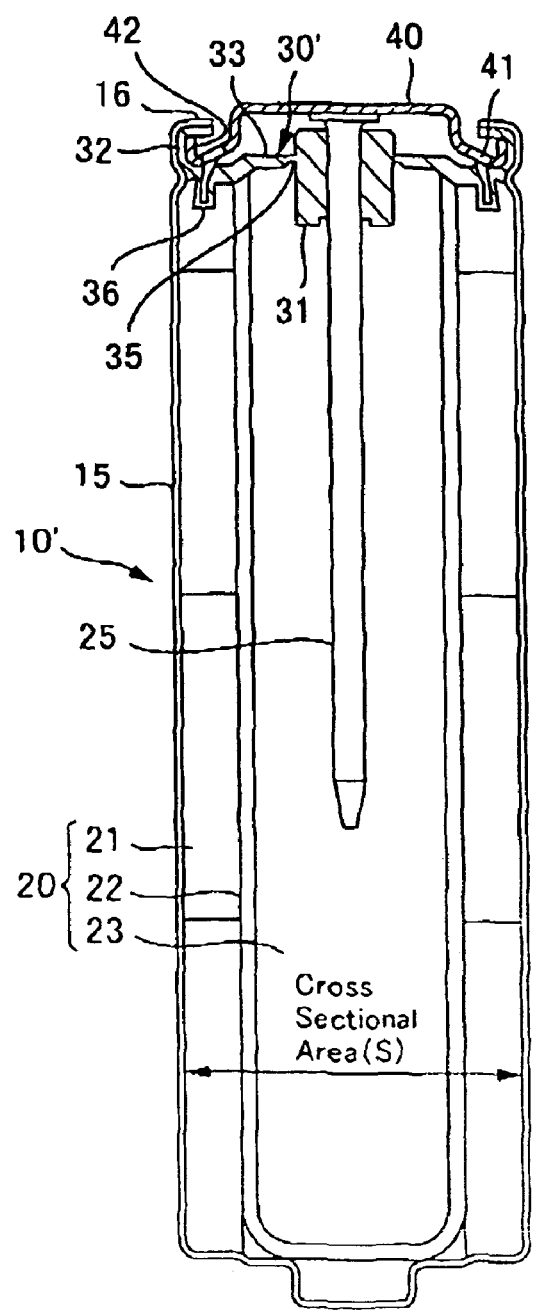
FIG. 3 is a cross-sectional view of a structure of the alkaline dry battery and the sealing gasket therefor using a non-stiffening type sealing gasket.

FIG. 2 shows partial cross-sectional views of an operative condition of the sealing gasket when an internal pressure of the battery case 15 is abnormally increasing. FIG. 2(*a*) is an operative condition of the conventional sealing gasket 30' composed of polyhexamethylene adipamide (nylon 66) and FIG. 2(*b*) is an operative condition of the sealing gasket 30 of the present invention made of polyhexamethylene dodecanamide (nylon 612), respectively. Reference numerals 10' and 10 refer to a conventional alkaline dry battery and the alkaline dry battery of the present invention, respectively.

According to the conventional sealing gasket 30', as shown in FIG. 2(*a*), the gasket 30' tends to be expanded and deformed by increase of the battery's internal pressure. This expansion deformation is caused by plasticization phenomenon of the resin that composes the gasket 30', and it is revealed that the plasticization phenomenon is easily caused when the resin is polyhexamethylene adipamide (nylon 66). Once this plasticization phenomenon occurs, the thin wall part 35 does not break beforehand even when the internal pressure of battery exceeds a predetermined working pressure, thus a reliable safety valve operation cannot be obtained. Further, under a steady condition that the expansion deformation by the battery's internal pressure is not caused, it is revealed that the plasticization becomes a key factor for weakening a sealing effect of the gasket 30'.

On the other hand, the sealing gasket 30 of the present invention, as shown in FIG. 2(*b*), hardly undergoes the expansion deformation by the plasticization phenomenon even when the battery's internal pressure increases. By this means, the first thin wall part 35 can function as a safety valve by reliably breaking beforehand when the internal pressure of the battery exceeds the predetermined working pressure. Further, under the steady condition in that the expansion deformation by the battery's internal pressure is not caused, it is revealed that the sealing effect of the gasket 30 can be maintained stable for a long term since the plasticization of the resin is hardly caused.

Furthermore, polyhexamethylene dodecanamide (nylon 612) has less water intrusion level compared to polyhexamethylene adipamide (nylon 66). However, this fact is extremely effective for maintaining anti-leakage performance for a long term under high temperature and high humidity.

An accelerated test for evaluating anti-leakage performance under various conditions was conducted for a conventional alkaline dry battery with a sealing gasket having the above shape/structure with non-stiffening structure made of polyhexamethylene adipamide (nylon 66) and for an alkaline dry battery of the present invention with a sealing gasket having the above shape/structure with non-stiffening structure made of polyhexamethylene dodecanamide (nylon 612), respectively. Then, the following results are obtained:

Test 1:

For LR6 type alkaline dry battery, a test for evaluating a level of plasticization and a rate of leakage occurrence (number of occurrence(s)/number of samples) was performed in relation to a term of storage in the dry air at 90° C. The result is shown in Table 1.

TABLE 1

(A result of Test 1):
Level of Plasticization and Rate of Leakage Occurrence
The LR6 type alkaline dry battery (prototype)
was stored at 90° C. in the dry air.

| Storage Term | Conventional Structure (6-6Nylon) | | Structure of Present Invention (6-12Nylon) | |
|---|---|---|---|---|
| | Level of Plasticization | Rate of Leakage Occurrence | Level of Plasticization | Rate of Leakage Occurrence |
| After 10 days | A | 0/10 pieces | A | 0/10 pieces |
| After 20 days | A | 0/10 | A | 0/10 |
| After 30 days | B | 1/10 | A | 0/10 |
| After 40 days | B | 4/10 | A | 0/10 |
| After 50 days | C | 7/10 | A | 0/10 |
| After 60 days | C | 10/10 | A | 0/10 |

A: Slight plasticization,
B: Medium plasticization
C: Much plasticization

Test 2:

For an LR03 type alkaline dry battery, a test for evaluating a level of plasticization and a rate of leakage occurrence (number of occurrence(s)/number of samples) was performed in relation to a term of storage at 90° C. in the dry air. The result is shown in Table 2.

TABLE 2

(A result of Test 2):
Level of Plasticization and Rate of Leakage Occurrence
The LR03 type alkaline dry battery (prototype)
was stored at 90° C. in the dry air.

| Storage Term | Conventional Structure (6-6Nylon) | | Structure of Present Invention (6-12Nylon) | |
|---|---|---|---|---|
| | Level of Plasticization | Rate of Leakage Occurrence | Level of Plasticization | Rate of Leakage Occurrence |
| After 10 days | A | 0/10 pieces | A | 0/10 pieces |
| After 20 days | A | 0/10 | A | 0/10 |
| After 30 days | B | 1/10 | A | 0/10 |
| After 40 days | B | 3/10 | A | 0/10 |
| After 50 days | C | 5/10 | A | 0/10 |
| After 60 days | C | 7/10 | A | 0/10 |

A: Slight plasticization,
B: Medium plasticization
C: Much plasticization

Test 3:

For an LR03 type alkaline dry battery, a test for evaluating an amount of water intrusion and a rate of leakage occurrence (number of occurrence(s)/number of samples) was performed in relation to a term of storage in the air at 70° C./90% RH. The result is shown in Table 3.

TABLE 3

(A result of Test 3):
Amount of Water Intrusion and Rate of Leakage Occurrence
The LR03 type alkaline dry battery (prototype)
was stored in the air at 70° C./90% RH.

| Storage Term | Conventional Structure (6-6Nylon) | | Structure of Present Invention (6-12Nylon) | |
|---|---|---|---|---|
| | Amount of Water Intrusion | Rate of Liquid Leakage Occurrence | Amount of Water Intrusion | Rate of Leakage Occurrence |
| After 5 days | 20 mg | 0/10 pieces | 7 mg | 0/10 pieces |
| After 10 days | 40 mg | 0/10 | 11 mg | 0/10 |
| After 15 days | 60 mg | 4/10 | 15 mg | 0/10 |
| After 20 days | — | 10/10 | 20 mg | 0/10 |
| After 25 days | — | — | 26 mg | 0/10 |
| After 30 days | — | — | 32 mg | 0/10 |
| After 35 days | — | — | 39 mg | 0/10 |
| After 40 days | — | — | 45 mg | 1/10 |

Test 4:

For an LR6 type alkaline dry battery, a test for evaluating a relationship between a thickness of a thin wall part and a rate of leakage occurrence (number of occurrence(s)/number of samples) was performed after 40 days of storage in the air at 70° C./90% RH. The result is shown in Table 4.

TABLE 4

(A result of Test 4): LR6 type alkaline dry battery (prototype) was used.
A thickness of a thin wall part and a rate of leakage occurrence
after 40 days of storage in the air at 70° C./90% RH.

| Thickness of Thin Wall Part | Conventional Structure (6-6Nylon) Rate of Leakage Occurrence | Structure of Present Invention (6-12Nylon) Rate of Leakage Occurrence |
|---|---|---|
| 0.1 mm | 10/10 pieces | 3/10 pieces |
| 0.15 mm | 10/10 | 0/10 |
| 0.20 mm | 10/10 | 0/10 |
| 0.25 mm | 8/10 | 0/10 |
| 0.30 mm | 3/10 | 0/10 |

Test 5:

For an LR6 type alkaline dry battery, a test for evaluating a relationship between a thickness of a thin wall part and a rate of leakage occurrence (number of occurrence(s)/number of samples) was performed after 40 days of storage in the air at 70° C./90% RH. The result is shown in Table 5.

TABLE 5

(A result of Test 5): LR6 type alkaline dry battery (prototype) was used.
A thickness of a thin wall part and a rate of leakage occurrence after
40 days of storage in the air at 70° C./90% RH.

| Thickness of Thin Wall Part | Conventional Structure (6-6Nylon) Rate of Leakage Occurrence | Structure of Present Invention (6-12Nylon) Rate of Leakage Occurrence |
|---|---|---|
| 0.1 mm | 10/10 pieces | 7/10 pieces |
| 0.15 mm | 10/10 | 4/10 |
| 0.20 mm | 10/10 | 2/10 |
| 0.25 mm | 10/10 | 0/10 |
| 0.30 mm | 5/10 | 0/10 |

Test 6:

For an LR03 type alkaline dry battery, a test for evaluating a relationship between a thickness of a thin wall part and a rate of leakage occurrence (number of occurrence(s)/number of samples) was performed after 30 days of storage in the air at 70° C./90% RH. The result is shown in Table 6.

TABLE 6

(A result of Test 6): LR03 type alkaline dry battery (prototype) was used. A thickness of a thin wall part and a rate of leakage occurrence after 30 days of storage in the air at 70° C./90% RH.

| Thickness of Thin Wall Part | Conventional Structure (6-6Nylon) Rate of Leakage Occurrence | Structure of Present Invention (6-12Nylon) Rate of Leakage Occurrence |
| --- | --- | --- |
| 0.1 mm | 10/10 pieces | 1/10 pieces |
| 0.15 mm | 10/10 | 0/10 |
| 0.20 mm | 4/10 | 0/10 |
| 0.25 mm | 4/10 | 0/10 |
| 0.30 mm | 3/10 | 0/10 |

Test 7:

For an LR03 type alkaline dry battery, a test for evaluating a relationship between a thickness of a thin wall part and a rate of leakage occurrence (number of occurrence(s)/number of samples) was performed after 40 days of storage in the air at 70° C./90% RH. The result is shown in Table 7.

TABLE 7

(A result of Test 7): LR03 type alkaline dry battery (prototype) was used. A thickness of a thin wall part and a rate of leakage occurrence after 40 days of storage in the air at 70° C./90% RH.

| Thickness of Thin Wall Part | Conventional Structure (6-6Nylon) Rate of Leakage Occurrence | Structure of Present Invention (6-12Nylon) Rate of Leakage Occurrence |
| --- | --- | --- |
| 0.1 mm | 10/10 pieces | 5/10 pieces |
| 0.15 mm | 10/10 | 3/10 |
| 0.20 mm | 10/10 | 1/10 |
| 0.25 mm | 8/10 | 0/10 |
| 0.30 mm | 4/10 | 0/10 |

Test 8:

For an LR03 type alkaline dry battery, a test for evaluating a relationship between a ratio of total area of a thin wall part (%) and a rate of leakage occurrence (number of occurrence(s)/number of samples) was performed after 20 days of storage in the air at 70° C./90% RH. The result is shown in Table 8.

TABLE 8

(A result of Test 8): LR03 type alkaline dry battery (prototype) was used. A thickness of a thin wall part and a rate of leakage occurrence after 20 days of storage in the air at 70° C./90% RH.

| Ratio of Total Area of Thin Wall Part | Conventional Structure (6-6Nylon) | | Structure of Present Invention (6-12Nylon) | |
| --- | --- | --- | --- | --- |
| | Amount of Water Intrusion | Rate of Leakage Occurrence | Amount of Water Intrusion | Rate of Leakage Occurrence |
| 2% | 45 mg | 0/10 pieces | 11 mg | 0/10 pieces |
| 5% | 53 mg | 0/10 | 13 mg | 0/10 |
| 10% | 64 mg | 5/10 | 17 mg | 0/10 |
| 15% | 80 mg | 10/10 | 20 mg | 0/10 |
| 20% | 91 mg | 10/10 | 24 mg | 0/10 |

It is apparent from the above test results shown in Tables 1 to 8 that the alkaline dry battery 10 of the present invention can certainly improve reliability of a safety valve operation and anti-leakage performance in an alkaline dry battery by employing both a shape/structure of the sealing gasket 30 having the central boss 31, the perimeter part 32, the middle barrier 33, the first thin wall part 35, and the second thin wall part 36, and polyhexamethylene dodecanamide (nylon 612) as a material for the gasket 30.

Further, the results of Tests 4 to 7 shown in Tables 4 to 7 indicate that setting the thickness of the thin wall part to be 0.25 mm is effective for improving anti-leakage performance.

Further, the result of Test 8 in Table 8 shows that according to the structure of the present invention, when the ratio of the thin wall part is set greater than or equal to 5%, anti-leakage performance can be improved. To obtain a stress absorbing effect by the thin wall part, it is preferred that the ratio of the area of the thin wall part is set greater than or equal to 5%. However, there arose a drawback with the conventional structure that anti-leakage performance is lowered when the ratio of the area of the thin wall part is set to be greater than or equal to 5%. On the other hand, the structure of the present invention can achieve a favorable stress absorbing effect by increasing the ratio of the area of the thin wall part to be greater than or equal to 5% and improves anti-leakage performance at the same time.

Although the preferred implementation of the present invention has been described in detail so far, it is possible for the present invention to undergo various rearrangements, replacements, and modifications without departing from the sprit and scope of the invention defined in the attached scope of the claim.

According to the present invention, it is possible to certainly improve reliability of a safety valve operation and anti-leakage performance in an alkaline dry battery by using a sealing structure that is formed of small number of parts with a low cost.

What is claimed is:

1. An alkaline dry battery comprising:
   an alkaline power generation element comprising a cathode mixture formed into a tubular shape, a separator disposed inside the cathode mixture, the separator being impregnated with an alkaline electrolyte, and a gelled anode mixture filled inside of the separator;
   a cylindrical metallic battery case with a closed bottom that contains the alkaline power generation element and serves as both a cathode terminal and a cathode current collector;
   a dish-shaped metallic anode terminal plate having a bar-shaped anode current collector fixed vertically thereon in an internal surface thereof, the anode current collector being inserted into the anode mixture of the power generation element; and a sealing gasket of a polyamide resin disposed between the battery case and the anode terminal plate without using a stiffening member to seal the battery case in an airtight manner;

wherein the sealing gasket formed as an integrated molding product includes a central boss through which the anode current collector is inserted, a perimeter part which is disposed between an opening of the battery case and a peripheral part of the anode terminal plate and forms an airtight sealing by stress deformation caused by contact with an inwardly biased portion of the opening of the battery case, a middle barrier positioned between the boss and the perimeter part, a safety valve configured by a first thin wall part provided in a circular part between the boss and the middle barrier, and a stress absorbing part configured by a second thin wall part formed by bending the circular part between the perimeter part and the barrier, and wherein the sealing gasket is made of a polyamide resin of polyhexamethylene dodecanamide such that, in the absence of the stiffening member, the first thin wall part of the sealing gasket will break, as opposed to the remainder of the sealing gasket deforming, under pressure loading.

2. The alkaline dry battery according to claim 1, wherein a thickness of the thin wall part is less than or equal to 0.25 mm.

3. The alkaline dry battery according to claim 1, wherein the stress absorbing part is formed by the thin wall part having a U-shaped cross-sectional shape.

4. The alkaline dry battery according to claim 1, wherein a total area of the thin wall part is greater than or equal to 5% of a circumferential cross sectional area of the battery.

* * * * *